No. 741,908. PATENTED OCT. 20, 1903.
H. O. HEM.
BALANCING AND RECORDING MECHANISM FOR WEIGHING SCALES.
APPLICATION FILED MAY 27, 1902.
NO MODEL. 4 SHEETS—SHEET 1.
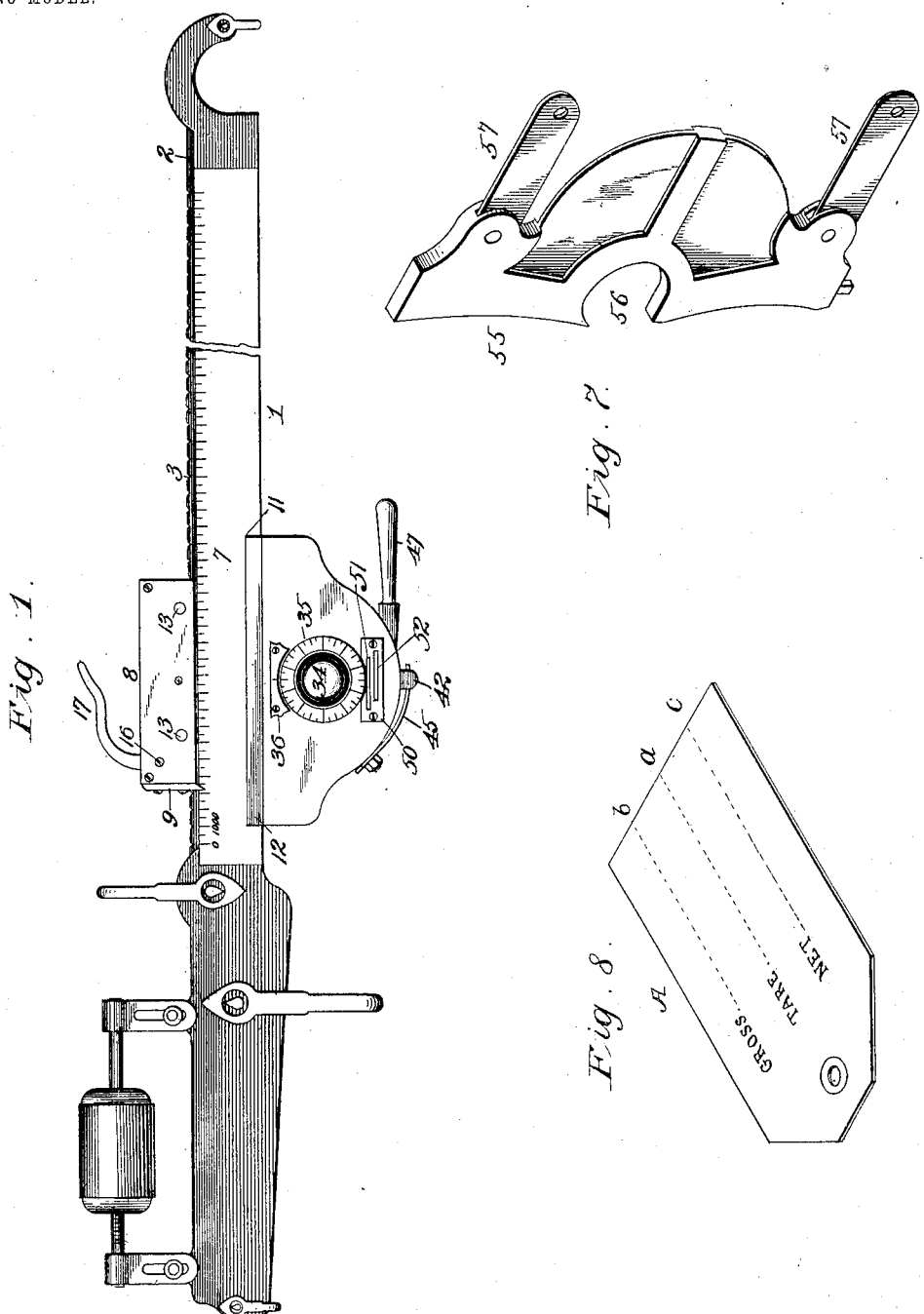
Witnesses:
Inventor:
H. O. Hem
By Fischer & Thorpe attys No. 741,908. PATENTED OCT. 20, 1903.
H. O. HEM.
BALANCING AND RECORDING MECHANISM FOR WEIGHING SCALES.
APPLICATION FILED MAY 27, 1902.
NO MODEL. 4 SHEETS—SHEET 2.
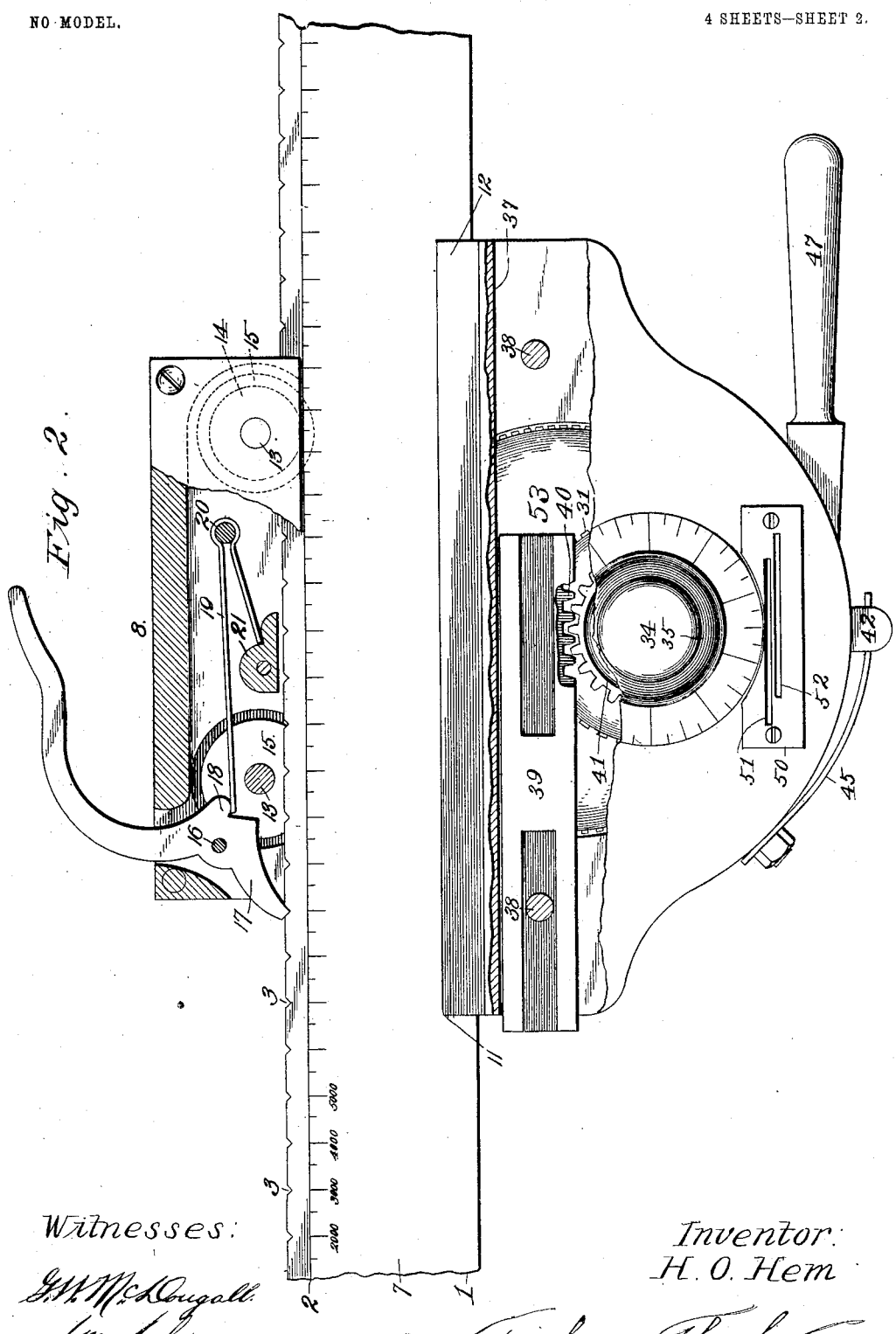
Witnesses:
G. W. McDougall
A. McArthur
Inventor:
H. O. Hem
By Fischer & Thorpe attys.

No. 741,908. PATENTED OCT. 20, 1903.
H. O. HEM.
BALANCING AND RECORDING MECHANISM FOR WEIGHING SCALES.
APPLICATION FILED MAY 27, 1902.
NO MODEL. 4 SHEETS—SHEET 3.
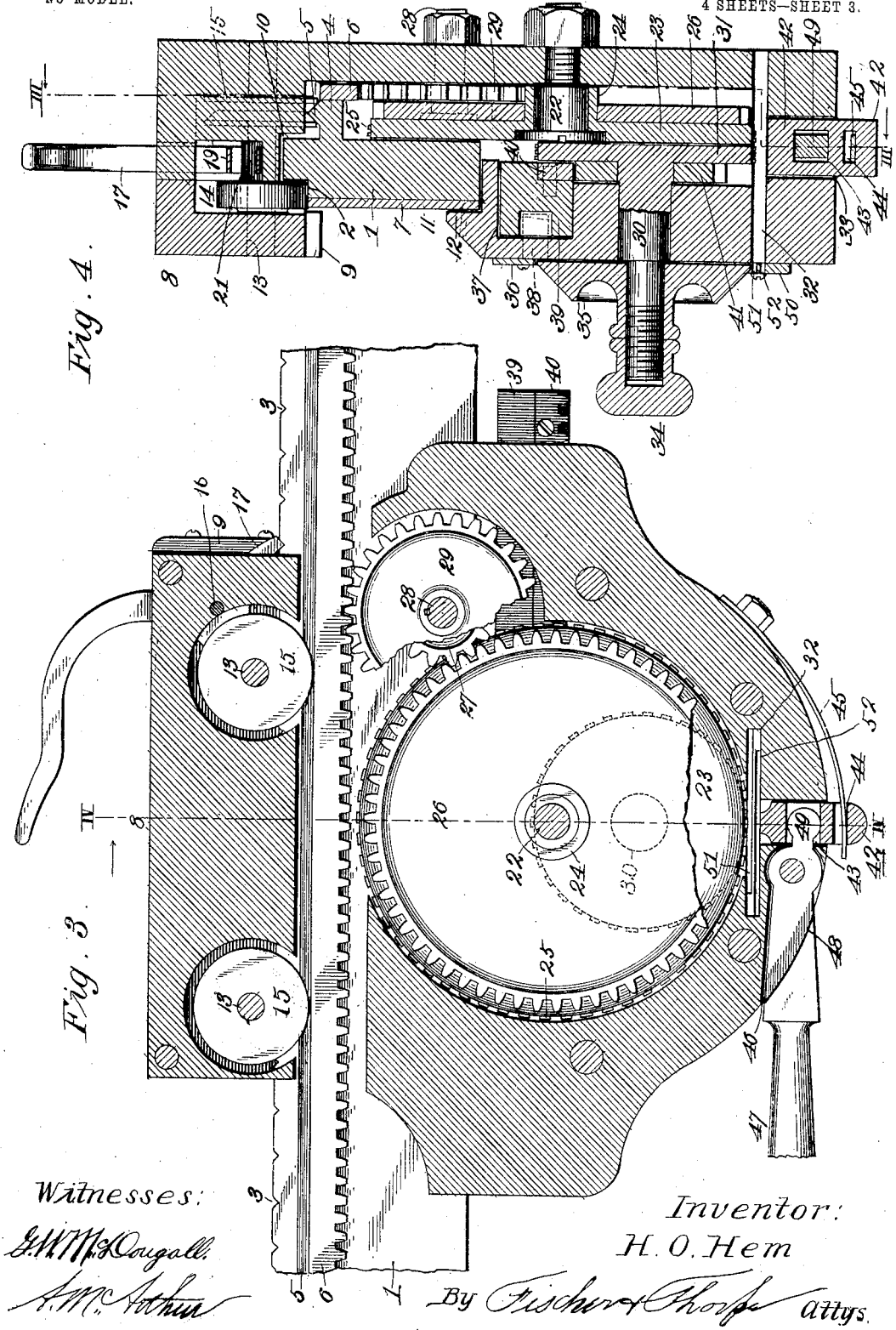
Witnesses:
G. W. McDougall.
A. McArthur
Inventor:
H. O. Hem
By Fischer & Thorpe attys.

No. 741,908. PATENTED OCT. 20, 1903.
H. O. HEM.
BALANCING AND RECORDING MECHANISM FOR WEIGHING SCALES.
APPLICATION FILED MAY 27, 1902.
NO MODEL. 4 SHEETS—SHEET 4.

Fig. 6.

Fig. 5.

Witnesses:
G. W. M. Dougall
F. M. Arthur

Inventor:
H. O. Hem
By Fischer & Thorpe attys.

No. 741,908. Patented October 20, 1903.

UNITED STATES PATENT OFFICE.

HALVOR O. HEM, OF KANSAS CITY, KANSAS.

BALANCING AND RECORDING MECHANISM FOR WEIGHING-SCALES.

SPECIFICATION forming part of Letters Patent No. 741,908, dated October 20, 1903.

Application filed May 27, 1902. Serial No. 109,239. (No model.)

*To all whom it may concern:*

Be it known that I, HALVOR O. HEM, a citizen of the United States, residing at Kansas City, in the county of Wyandotte and State of Kansas, have invented certain new and useful Improvements in Balancing and Recording Mechanism for Weighing-Scales, of which the following is a specification.

My invention relates to weighing-scales, and more especially to a balancing and recording mechanism of that class embodying a graduated beam, an adjustable poise thereon provided with printing wheel or wheels for automatic operation, and a supplemental poise carried adjustably by the first-named poise and geared to an adjustable printing-wheel also carried by said poise.

The object of the invention is to produce a balancing and recording mechanism of the type outlined which is strong and of more simple and compact construction than any with which I am familiar.

A further object of the invention is to produce means for increasing the recording capacity of the scale without using an unnecessary number of printing-wheels or the employment of such wheels of an inconveniently large size.

With these general objects in view and others as hereinafter appear the invention consists in certain novel and peculiar features of construction and organization, as hereinafter described and claimed, and in order that it may be fully understood reference is to be had to the accompanying drawings, in which—

Figure 1 is a face view of a beam and poise embodying my invention. Fig. 2 is a similar view on a larger scale, the poise being broken away and sectioned to disclose its internal construction. Fig. 3 is a vertical section taken on the line III III of Fig. 4. Fig. 4 is a vertical section taken on the line IV IV of Fig. 3. Fig. 5 is a vertical section taken on the line V V of Fig. 6. Fig. 6 is a vertical section taken on the line VI VI of Fig. 5. Fig. 7 is a detailed perspective view of the stamping-bar. Fig. 8 is a perspective view of one of the tags used in connection with my improved poise.

Referring now to the drawings in detail, 1 designates the scale-beam, longitudinally grooved or recessed at its upper front edge to provide an upwardly-disposed shoulder 2 and formed in its upper face above said shoulder with graduation-notches 3, said notches preferably being spaced to indicate one thousand pounds. At its rear side the beam is provided with a longitudinal rib 4, having a V-shaped track 5 at its upper side and a rack-bar 6, secured to its rear edge. On the face of the beam is secured a scale-plate 7, graduated to one thousand pounds and fractions thereof, the one-thousand-pound graduations registering with the notches 3.

8 designates the main poise, the same being of skeleton or hollow construction and preferably composed of sections riveted or bolted together, and secured to the poise at its inner edge is a pointer or indicator 9. The poise is provided with a groove 10, extending from one edge to the other to receive that portion of the beam above the shoulder 2, and has its front side slotted from edge to edge, as at 11, so as to expose the scale-plate, said slot being narrower than said plate and beam to provide a shoulder 12, which bears against the front side of the scale-plate and retains the poise vertically upon the beam.

13 designates horizontal shafts journaled in the upper part of the poise and provided with rollers 14, which rest and travel upon shoulder 2, and grooved rollers 15, which rest and travel upon tracks 5, the relation between the last-named rollers and tracks 5 serving to hold the poise against side movement upon the beam.

Pivoted, as at 16, in the upper part of the poise and near the inner end of the same is a handled dog 17 for successive engagement with notches 3, and said dog is provided with a shoulder 18, against which bears a spring 19, mounted on a stud 20 and having its opposite end bearing against a rigid cross-piece 21 of the poise, this spring serving to hold the dog in yielding engagement with the beam, as shown clearly in Fig. 2.

22 designates a stud-bolt secured in the rear wall of the poise below the beam and journaled upon the same, and arranged close to the rear side of the poise is a type-wheel 23, having a hub 24 bearing against the rear wall of the poise and provided on its periphery with a double row of type 25, beginning with "00" and graduated by thousands up to and including "99," the type-wheel figure "00" being vertically below the center of the wheel when the poise is set at the "0" position on the beam. Secured upon the hub of said type-wheel, at the rear side of the latter, is a cog-wheel 26 of almost equal diameter, and said cog-wheel meshes with a pinion 27, keyed upon a stub-shaft 28, journaled in the poise, said shaft also carrying between wheel 26 and the rear wall of the poise a cog-wheel 29, meshing with the rack-bar 6, the arrangement being such that movement of the poise on the beam imparts such movement to the type-wheel that the latter makes one complete revolution by the time the poise has traveled from its initial or "0" position on the beam to the outer end of the latter. The intermediate gearing therefore is to avoid the necessity of using a type-wheel of undesirable size.

30 designates a stub-shaft journaled in the front wall of the poise in the vertical plane of the axis of the type-wheel 23 and provided at its rear end, close to the front side of said type-wheel, with a small type-wheel 31, having three columns of type, beginning with "000" and graduated up to and including "999," the type on said wheel vertically below its center being flush with the corresponding type of the type-wheel and both registering with a transverse slot 32 and a vertical slot 33, the former extending through both walls of the poise, and in this connection it should be stated that whenever the dog is in engagement with a notch 3 a type of the type-wheel 23 is vertically below its axis. To enable the type-wheel to properly perform its function of printing thousands and tens of thousands, the type-wheel 31 is employed, containing units, tens, and hundreds columns of figures from "000" to "999," inclusive, as explained in the preceding paragraph, these figures recording weights under one thousand pounds, and to insure the proper adjustment of said wheel the following mechanism is employed: 34 is a knob or handle screwed or otherwise secured to the front end of stub-shaft 30, and 35 a dial-plate also secured thereon and contiguous to the face of the poise, said dial-plate being graduated by hundreds and fractions thereof, like type-wheel 31, the graduations of said dial being adapted to successively register with the mark of an indicator-plate 36, secured to the poise vertically above the dial. Between the beam 1 and stub-shaft 30 the front wall of the poise is provided at its inner side with a longitudinal groove 37, wherein projects rearwardly stub-pins 38, said stub-pins engaging the longitudinally-grooved supplemental poise 39, provided with a rack-bar 40, engaging a cog-wheel 41, secured rigidly upon the stub-shaft 30, so that when the latter is turned said supplemental poise is operated, its movement being such that it will register from "0" up to and including nine hundred and ninety-nine pounds, the amount weighed being represented by the type of wheel 31, disposed vertically below the center of the latter, as will be readily understood.

From the foregoing it will be apparent that to weigh amounts less than one thousand pounds it is not necessary to move poise 8 upon the beam. To weigh an even thousand pounds or multiple thereof, the supplemental poise occupies its innermost position of adjustment—that is to say, the "0" mark on dial-plate 35 registers with the mark on the indicator-plate 36, at which time the "000" figure of the type-wheel 31 is presented below its center. The poise is then slid outward on the beam until dog 17 engages notch 3, registering with the "1,000" mark on the scale-plate, which movement, through the gearing described, disposes the figure "1" of the thousands-column of type-wheel 23 in line with the "000" figure of type-wheel 31. When the poise is moved to the second notch, figure "2" of wheel 23 registers with the "000" mark of wheel 31, and so on. To record one thousand nine hundred and ninety-nine pounds, the poise 8 is first moved until the dog engages the notch which represents one thousand, and then the supplemental poise is adjusted until the "999" figure of type-wheel 31 registers with the "1" of type-wheel 23.

Referring now to the means for effecting the imprint of the amount weighed on a tag, as at A, 42 designates a plunger mounted slidingly in vertical slot 33 and provided with openings 43 and 44, a spring 45, secured to the lower edge of the poise and projecting through opening 44, holding said plunger normally depressed. Registering with slot 33 is a notch 46 in the poise, and projecting into said notch and pivoted on the poise is a lever 47, having shoulders 48 to bear against the lower edge of the poise at opposite sides of notch 46, and thus limit the distance which spring 45 depresses the plunger, and said lever is provided with a head 49, engaging opening 43 of the plunger to effect vertical movement of the latter against the resistance of spring 45 when the operator grasps and depresses the handle end of the lever. This action causes the plunger to elevate the tag fitting in slot 32 and press it with sufficient force against the type of the type-wheels to receive the imprint thereof, and in order that the gross weight and tare may be properly registered upon the tag the front end of the slot is bridged by a plate 50, containing two slots 51 52, both registering with slot 32, with the left-hand end of the upper one projecting beyond the corresponding end of the lower one and with the right-hand end of the lower one projecting beyond the corresponding end of the upper one. To get the tare, the vehicle to be loaded is first run upon the scales and the poise adjusted until balanced upon the beam. The tag is then slipped in slot 51 and lever 47 operated. This imprints the weight of the vehicle upon the tag along the line $a$. After the vehicle is loaded it is again run upon the scales, the poise adjusted to balance the beam, and the tag slipped in slot 52. The lever is again manipulated, the result being the gross weight is imprinted on the tag above the tare weight, as along the line $b$. The proper person then deducts the tare from the gross weight to obtain the net weight, the result being inscribed upon the tag along the line $c$ below the tare weight.

Where it is desired to weigh amounts from ninety-nine thousand nine hundred and ninety-nine pounds up to and including one hundred and ninety-nine thousand nine hundred and ninety-nine pounds, the wheels 23, 26, 27, and 29 are dispensed with and in lieu of said type-wheel 23 and cog-wheel 26 I employ similar, but preferably somewhat larger, wheels, (numbered 53 and 54, respectively.) Type-wheel 53 is likewise mounted on stub-shaft 22, and cog-wheel 54 is secured to the hub of said type-wheel and meshes with rack-bar 6. (See Figs. 5 and 6.)

55 designates a stamping-bar arranged between type-wheel 53 and cog-wheel 54 and provided with a notch 56, fitting loosely around the hub of the former and having its upper and lower ends vertically alined with the axis of said wheel and its lower end provided with a single type-figure "1," representing hundred thousands and under the gravitative action of the bar normally disposed slightly lower than the lines of type of the type-wheels. It is free to play vertically upon links 57 until the poise has been moved outward upon the beam until the pointer or indicator 9 reaches the hundred-thousand mark on the scale-plate, from which point to the two-hundred-thousand mark on said plate a stop-plate 58 is secured to the under side of scale-beam rib 4, which stop-plate when vertically above the stamping-bar prevents the latter from rising above the plane of the lowest type-figures of the type-wheels in order that when the tag is inserted in slot 32 and pressed upwardly by the plunger in the manner hereinbefore explained said type-figure "1" of the stamping-bar shall, like the said type-wheel figures, make its impression upon the tag. It will thus be seen that by means of this stamping-bar the scale is capable of recording any weight up to and including one hundred and ninety-nine thousand nine hundred and ninety-nine pounds. Where the stamping-bar is employed, the number of teeth on cog-wheel 54 must equal the number of teeth on rack-bar 6 if said parts intermesh, it being obvious that this direct relation of said parts is not the only way of securing the desired result.

From the above description it will be apparent that I have produced a balancing and recording mechanism for weighing-scales which embodies the features of advantage enumerated as desirable, and while I have illustrated and described the preferred embodiment of the invention it is to be understood that it is susceptible of modification in various particulars without departing from its principle and scope or sacrificing any of its advantages.

Having thus described the invention, what I claim as new, and desire to secure by Letters Patent, is—

1. A balancing and recording mechanism for weighing-scales, comprising a scale-beam, a poise thereon, a non-rotary stamping-bar adjustable with the poise on and independently movable toward or from the beam, and means to limit the movement of the stamping-bar toward the beam when the poise occupies a certain position thereon.

2. A balancing and recording mechanism for weighing-scales, comprising a scale-beam, a poise thereon, a non-rotary stamping-bar adjustable with the poise on and independently movable toward or from the beam, means for producing a relative movement between the stamping-bar and a tag to obtain an impression of the former on the latter, and means to limit such relative movement when the poise occupies a certain position on the beam.

3. A balancing and recording mechanism for weighing-scales, comprising a scale-beam, a poise thereon, a non-rotary stamping-bar adjustable with the poise on and independently movable toward or from the beam, means to limit the movement of the stamping-bar toward the beam when the poise occupies a certain position thereon and a plunger movable toward and from the stamping-bar and located at the opposite end of the stamping-bar from such limiting means.

4. A balancing and recording mechanism for weighing-scales, comprising a scale-beam, a poise thereon, a stamping-bar adjustable with the poise on the beam and independently movable toward or from the latter and means to limit the movement of the stamping-bar toward the beam when the poise occupies a certain position thereon.

5. A balancing and recording mechanism for weighing-scales, comprising a scale-beam, a poise thereon, a stamping-bar adjustable with the poise on the beam and independently movable toward or from the latter, means to limit the movement of the stamping-bar toward the beam when the poise occupies a certain position thereon, and a plunger also adjustable with the poise on the beam and toward and from the stamping-bar and located at the opposite end of said bar from said limiting means.

6. A balancing and recording mechanism for weighing-scales, comprising a scale-beam, a poise thereon, a stamping-bar adjustable with the poise on the beam and independently movable toward or from the latter, a plunger also adjustable with the poise on the beam and toward and from the stamping-bar, and means to cut short the usual movement of the stamping-bar in one direction when the poise occupies a certain position on the beam.

7. A balancing and recording mechanism for weighing-scales, comprising a scale-beam, a poise upon said beam, a movable stamping-bar carried by the poise, a stop-plate at a suitable point on the beam to limit the movement of the stamping-bar, and means for producing a relative movement between the stamping-bar and a tag, whereby the latter shall receive an impression from the former.

8. A balancing and recording mechanism for weighing-scales, comprising a scale-beam, a poise thereon, a stamping-bar adjustable with the poise on the beam and independently movable toward or from the latter, a plunger also adjustable with the poise on the beam and movable toward and from the stamping-bar, and means to cut short the usual movement of the stamping-bar and plunger in one direction when the poise occupies a certain position on the beam.

9. A balancing and recording mechanism for weighing-scales, comprising a scale-beam, a poise thereon, having a transverse tag-slot, a stamping-bar adjustable with the poise and interposed between its slot and the scale-beam, a plunger carried by the poise at the opposite side of said slot, and means to cut short the usual movement of the poise and plunger in one direction when the poise occupies a certain position on the beam.

10. A balancing and recording mechanism for weighing-scales, comprising a scale-beam, a poise thereon, having a transverse tag-slot, a stamping-bar adjustable with the poise and interposed between its slot and the scale-beam, a plunger carried by the poise at the opposite side of said slot, and a stop-plate secured to the beam and adapted to limit the movement toward the beam of the stamping-bar and plunger.

11. A balancing and recording mechanism for weighing-scales, comprising a scale-beam, a poise thereon, having a transverse tag-slot, a stamping-bar adjustable with the poise and interposed between its slot and the scale-beam, a plunger carried by the poise at the opposite side of said slot, and pressed yieldingly away from the stamping-bar and beam, and a stop-plate secured to the beam and adapted to limit the movement toward the beam, of the stamping-bar and plunger.

12. A balancing and recording mechanism for weighing-scales, comprising a scale-beam, a poise thereon, having a transverse tag-slot, a stamping-bar adjustable with the poise and interposed between its slot and the scale-beam, a plunger carried by the poise at the opposite side of said slot and pressed yieldingly away from the stamping-bar and beam, a lever mounted on the poise and engaging the plunger, and a stop-plate secured to the beam and adapted to limit the movement toward the beam, of the stamping-bar and plunger.

13. A balancing and recording mechanism for weighing-scales, comprising a scale-beam, a poise thereon, having a transverse tag-slot, a stamping-bar adjustable with the poise and interposed between its slot and the scale-beam, a plunger carried by the poise at the opposite side of said slot, and provided with a pair of openings, a spring secured to the poise and projecting in one of the plunger-openings to hold the latter away from the stamping-bar, a lever mounted on the poise and engaging the other opening of the plunger to move it toward the stamping-bar, and means to cut short the usual movement of the poise and plunger in one direction when the poise occupies a certain position on the beam.

14. A balancing and recording mechanism for weighing-scales, comprising a scale-beam, a poise thereon, a type-wheel journaled in the poise and adjustable through the movement of the latter on the beam, and a stamping-bar adjustable with the poise on the beam and independently movable toward and from the latter.

15. A balancing and recording mechanism for weighing-scales, comprising a scale-beam, a poise thereon, a type-wheel journaled in the poise and adjustable through the movement of the latter on the beam, a stamping-bar adjustable with the poise on the beam and independently movable toward and from the latter, and a plunger movable toward and from the stamping-bar and wheel.

16. A balancing and recording mechanism for weighing-scales, comprising a scale-beam, a poise thereon, a type-wheel journaled in the poise and adjustable through the movement of the latter on the beam, a stamping-bar adjustable with the poise on the beam, and independently movable toward and from the latter, and means to arrest the movement of the stamping-bar toward the beam when its operative face attains the plane of the type-wheel face at a point diametrically opposite from the beam.

17. A balancing and recording mechanism for weighing-scales, comprising a scale-beam, a poise thereon, a type-wheel journaled in the poise and adjustable through the movement of the latter on the beam, a stamping-bar adjustable with the poise on the beam and independently movable toward and from the latter, a plunger movable toward and from the stamping-bar and wheel, and means to arrest the movement of the stamping-bar toward the beam when its operative face attains the plane of the type-wheel face at a point diametrically opposite from the beam.

18. A balancing and recording mechanism for weighing-scales, comprising a scale-beam, a poise thereon, a stamping-bar within the poise, links pivotally connecting the stamping-bar and the poise to permit the former to move toward and from the beam, and means to limit the movement of the stamping-bar toward the beam when the poise occupies a certain position thereon.

19. A balancing and recording mechanism for weighing-scales, comprising a scale-beam, a poise thereon, a stamping-bar within the poise, links pivotally connecting the stamping-bar and the poise to permit the former to move toward and from the beam, and a stop-plate on the beam to arrest the movement of the stamping-bar in one direction.

20. A balancing and recording mechanism for weighing-scales, comprising a scale-beam provided with a graduated face-plate, a poise slidingly mounted on said beam and provided with an indicator to successively register with said graduations, a movable stamping-bar in said poise, provided with a type, a plunger opposite and adapted to force a tag against the type, and a stop-plate carried by the beam and adapted at times to intercept the path of movement of said stamping-bar and thereby cause the latter to make an impression on a tag forced against its type by the plunger.

21. A balancing and recording mechanism for weighing-scales, comprising a scale-beam provided with a graduated face-plate, a poise slidingly mounted on said beam and provided with an indicator to successively register with said graduations, a movable stamping-bar in said poise, provided with a type, a plunger held yieldingly away from the type of said stamping-bar, means for raising the plunger and causing the same to force a tag against said type, and a stop-plate carried by the beam and adapted at times to intercept the path of movement of said stamping-bar and thereby cause the latter to make an impression on a tag forced against the type by the plunger.

22. A balancing and recording mechanism for weighing-scales, comprising a scale-beam provided with a graduated face-plate, a poise slidingly mounted on the beam and provided with an indicator to successively register with said graduations, a movable stamping-bar in said poise provided with a type, a plunger held yieldingly away from the type of said stamping-bar, a lever mounted in the poise and engaging said plunger and adapted to cause the same to force a tag against said type, and a stop-plate carried by the beam and adapted at times to intercept the path of movement of said stamping-bar and thereby cause the latter to make an impression on a tag forced against the type by the plunger.

23. A balancing and recording mechanism for weighing-scales, comprising a scale-beam provided with a graduated face-plate, a rearwardly-projecting rib, and a rack-bar, a type-wheel geared to said rack-bar, a movable stamping-bar having a type in alinement with certain type of said wheel, a second type-wheel journaled in the poise and having certain type in alinement with the type of the first-named type-wheel and stamping-bar, means to adjust said second type-wheel, a supplemental poise mounted slidingly in the first-named poise and geared to said second type-wheel, a plunger mounted in the first-named poise and adapted to force a tag against the alined type of said wheels and stamping-bar, and a stop-plate secured to the scale-beam and adapted to register at times with said stamping-bar and prevent the latter from moving under the pressure imposed upon said tag by the plunger.

24. A balancing and recording mechanism for weighing-scales, comprising a graduated scale-beam, a poise mounted thereon and provided with a printing mechanism geared to said beam and adapted to be adjusted by movement of the poise upon the beam, a second printing mechanism carried by the poise, a supplemental poise mounted on the first-named poise and geared to said second printing mechanism, a stamping-bar within the poise and provided with a type-figure in alinement with the operative type-figures of said printing mechanisms, means to prevent said stamping-bar from being swung to an inoperative position, and means for forcing a tag against said printing mechanism and said stamping-bar when the latter is restrained from moving to an inoperative position.

25. A balancing and recording mechanism for weighing-scales, comprising a scale-beam having a rack-bar, a poise thereon with means to hold it at the required point, a stub-shaft secured to the rear wall of the poise, a type-wheel journaled on said stub-shaft, a cog-wheel movable with the type-wheel and meshing with said rack-bar, a stamping-bar carried by and movable in the poise toward or from the scale-beam, and having its ends vertically above and below the axis of said shaft, and a stop-plate on the beam to limit the movement of the stamping-bar in that direction.

In testimony whereof I affix my signature in the presence of two witnesses.

HALVOR O. HEM.

Witnesses:
H. C. RODGERS,
G. Y. THORPE.